US009828194B2

(12) United States Patent
Guindani et al.

(10) Patent No.: US 9,828,194 B2
(45) Date of Patent: Nov. 28, 2017

(54) STATION FOR LOADING AND UNLOADING PIECE-CARRYING CONTAINERS

(75) Inventors: Giuseppe Guindani, Grugliasco (IT); Gianni Magni, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 461 days.

(21) Appl. No.: 14/131,047

(22) PCT Filed: Jul. 4, 2012

(86) PCT No.: PCT/IB2012/053412
§ 371 (c)(1),
(2), (4) Date: Mar. 23, 2014

(87) PCT Pub. No.: WO2013/005169
PCT Pub. Date: Jan. 10, 2013

(65) Prior Publication Data
US 2014/0199139 A1    Jul. 17, 2014

(30) Foreign Application Priority Data

Jul. 7, 2011 (IT) .............................. TO2011A0599

(51) Int. Cl.
*B65G 65/00* (2006.01)
*B23Q 7/02* (2006.01)
(Continued)

(52) U.S. Cl.
CPC ............... *B65G 65/00* (2013.01); *B23Q 1/66* (2013.01); *B23Q 7/02* (2013.01); *B23Q 7/1431* (2013.01)

(58) Field of Classification Search
CPC ........ B65G 65/00; B23Q 1/66; B23Q 7/1431; B23Q 7/02
See application file for complete search history.

(56) References Cited

U.S. PATENT DOCUMENTS

| 4,673,076 A | 6/1987 | Mattson |
| 5,882,174 A | 3/1999 | Woerner et al. |

(Continued)

FOREIGN PATENT DOCUMENTS

| DE | 19736252 A1 | 3/1999 |
| EP | 0673711 A1 | 9/1995 |

(Continued)

OTHER PUBLICATIONS

The International Search Report and the Written Opinion dated Aug. 31, 2012.

*Primary Examiner* — Scott Lowe
(74) *Attorney, Agent, or Firm* — Young Basile Hanlon & MacFarlane, P.C.

(57) ABSTRACT

A system for loading and unloading piece-carrying containers (C) in an industrial plant, comprising:
  a station (2) for loading and unloading said containers;
  a workstation (3) to which the loaded containers are brought and at which the pieces are taken from said containers; and
  a turret (6), which can turn about a vertical axis and is designed to exchange with one another a first container in said workstation and a second container in said loading and unloading station, through a predetermined movement of rotation of said turret,
said system being characterized in that, in order to carry out said exchange of said first and second containers, said turret is configured for lifting said first and second containers so as to release them and pick them up from said stations.

14 Claims, 5 Drawing Sheets

(51) Int. Cl.
   *B23Q 7/14* (2006.01)
   *B23Q 1/66* (2006.01)

(56) References Cited

U.S. PATENT DOCUMENTS

| | | | |
|---|---|---|---|
| 2009/0191032 A1 | 7/2009 | Bogaczyk | |
| 2010/0290870 A1* | 11/2010 | Ezure | ................... H05K 13/02 |
| | | | 414/222.04 |

FOREIGN PATENT DOCUMENTS

| | | | |
|---|---|---|---|
| EP | 0865869 A1 | 9/1998 |
| EP | 1310324 A1 | 5/2003 |
| EP | 2082831 A1 | 7/2009 |

\* cited by examiner

STATION FOR LOADING AND UNLOADING PIECE-CARRYING CONTAINERS

TECHNICAL FIELD

The present invention relates to a system for loading and unloading piece-carrying containers in an industrial plant.

BACKGROUND

The present invention relates to a system for loading and unloading piece-carrying containers in an industrial plant, of the type comprising:
- a station for loading and unloading said containers;
- a workstation to which the loaded containers are brought and at which the pieces are taken from said containers; and
- a turret, which can turn about a vertical axis and is designed to exchange with one another a first container in said workstation and a second container in said loading and unloading station through a predetermined movement of rotation of said turret.

A system of this type is described, for example, in the European patent application No. EP0673711A1.

A system of this type is also described in the U.S. patent application No. US2009/0191032A1. In the system described in said document, the containers travel on trolleys that are engaged by anchoring structures carried by the turret and moved, through rotation of the turret, between the loading and unloading station and the workstation.

SUMMARY

The object of the present invention is to provide a system that, as compared to what is described in the document referred to above, is more suited to interfacing with automated and robotized production lines.

A further object of the present invention is to provide a system that will be highly efficient and fast in making changes between containers.

Another object is to provide a system in which it is possible to envisage the presence of the operator in the vicinity of the loading and unloading station, in conditions of total safety.

One or more of the above objects are achieved via a system for loading and unloading piece-carrying containers of the type specified above comprising the characteristic in that in order to carry out said exchange of said first and second containers said turret is configured for lifting said first and second containers so as to pick them up from said stations. In various embodiments, the system described herein envisages that the turret is configured for lifting, preferably simultaneously, the container in the loading and unloading station and the container in the workstation in order to pick them up from the respective stations and then carry out exchange of said containers via rotation of the turret itself. Consequently, unlike what occurs in the solution according to the known art illustrated above, the system described herein is able to release the containers from the conveying means with which these are brought up to the system, this enabling a full control on said containers and hence enabling their positioning in a precise, predetermined, and repeatable way within the workstation. As will emerge more clearly from what follows, thanks to the aforesaid characteristics, the system described herein can consequently be advantageously associated to a manipulator robot that automatically picks up the pieces from the containers.

In various embodiments, in the system described herein the loading and unloading station is configured for receiving one or more containers at a time on trolleys, whilst the workstation is configured for receiving, from said turret, the aforesaid one or more containers without trolleys, said workstation having means designed to constitute a reference for positioning said containers in a precise and predetermined way.

A further advantageous characteristic of the invention is the feature wherein said turret comprises a first lifting fork or platform and a second lifting fork or platform, which lie in a plane orthogonal to the axis of rotation of the turret and are mobile between a lowered position and a raised position, guided along the axis of rotation of the turret by drive means.

A further advantageous characteristic of the invention is the feature wherein said first and second lifting forks or platforms are carried by a single lifting body that envelops the vertical structure of said turret and is slidably guided along it, and wherein said first and second lifting forks or platforms are mutually arranged so as to be simultaneously one in the workstation and the other in the loading and unloading station, and vice versa.

A further advantageous characteristic of the invention is the feature wherein the loading and unloading station and the workstation occupy opposed positions with respect to the turret.

A further advantageous characteristic of the invention is the feature wherein said turret is designed to position said containers in co-operation with means of said workstation designed to constitute a reference for positioning said containers in a precise and predetermined way.

A further advantageous characteristic of the invention is the feature wherein said means comprise guide surfaces, inclined with respect to a vertical direction, which are designed to engage the container and to orient it in the correct position whilst the container is made to drop downwards by the turret.

A further advantageous characteristic of the invention is the feature wherein said means comprise a board designed to define a resting surface for the container and comprising, on said resting surface, reference plates, each having a vertical wall and, on top of said vertical wall, a guide wall inclined with respect to the vertical, said plates being mutually arranged in such a way that their respective vertical walls are designed to contain the sides of the container, substantially without allowing this any possibility of moving, and their respective inclined walls are instead designed to guide the container between said vertical walls while the container is made to drop downwards towards the resting surface.

A further advantageous characteristic of the invention is the feature wherein the loading and unloading station has means for receiving and guiding said trolley up to the turret.

A further advantageous characteristic of the invention is the feature wherein said means comprise a bank of freely rotatable rollers, which are mounted on brackets fixed to the floor and are arranged in two opposed and substantially parallel rows, designed to guide the trolley during approach to the turret, and two mutually diverging rows, set in front of said parallel rows and designed to create a sort of lead-in for insertion of the trolley between the two parallel rows.

The claims form an integral part of the technical teaching provided herein in relation to the invention.

BRIEF DESCRIPTION OF THE DRAWINGS

The invention will now be described, purely by way of non-limiting example, with reference to the annexed drawings, in which.

DETAILED DESCRIPTION

Figure 1:
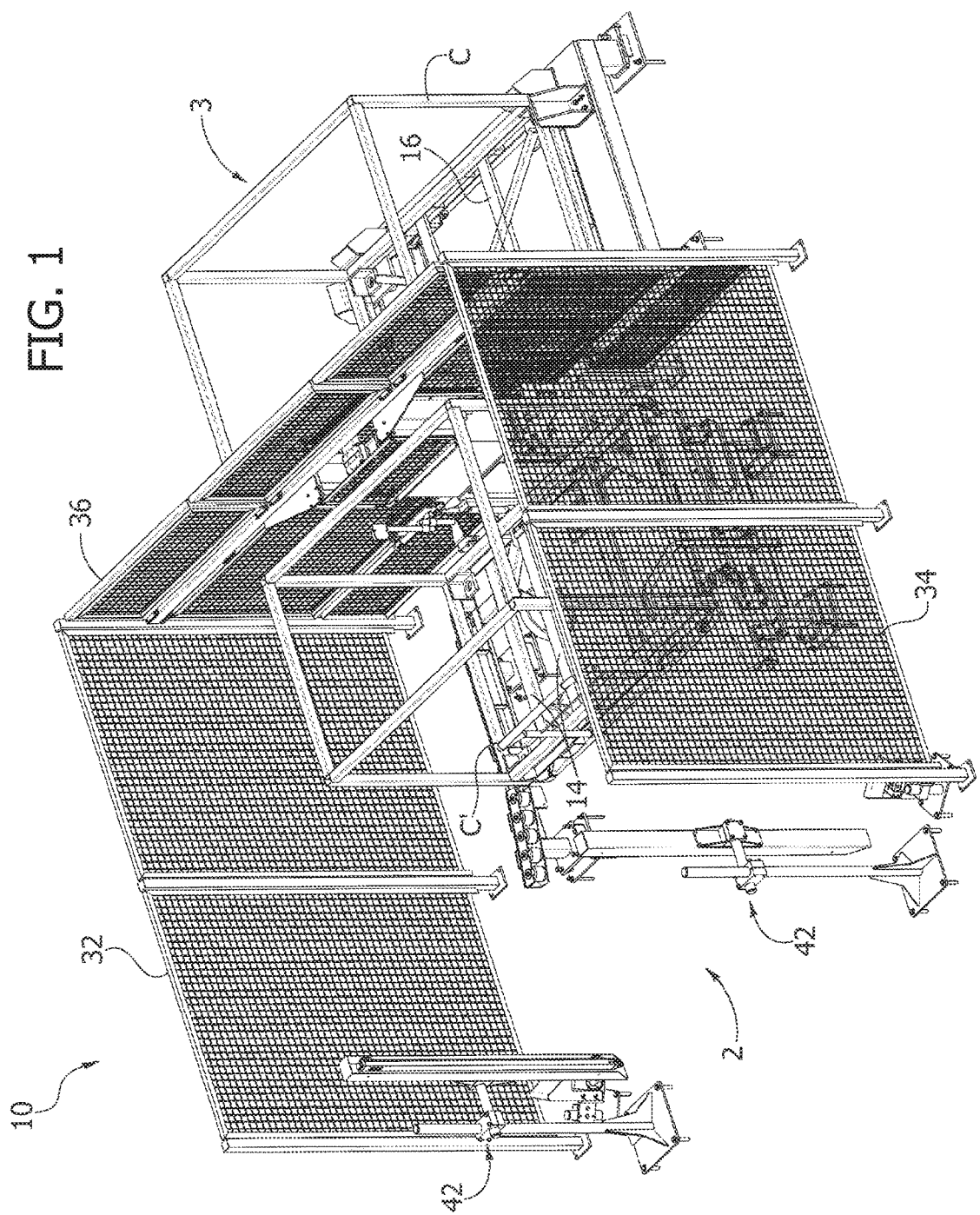
FIG. 1 is a first perspective view from above of the system described herein.
Figure 2:
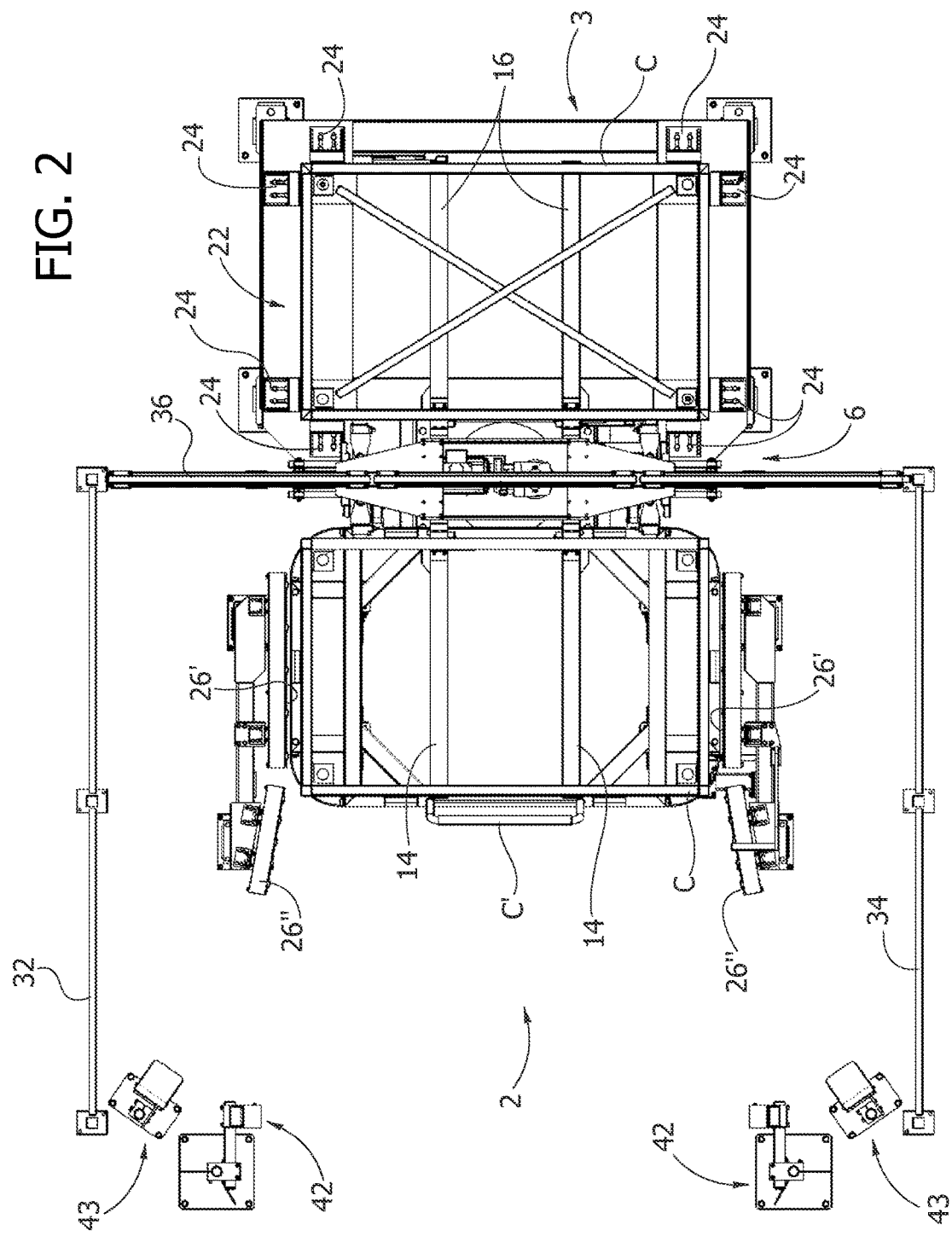
FIG. 2 is a top plan view of the system of FIG. 1.

Illustrated in the ensuing description are the various specific details aimed at providing an in-depth understanding of the embodiments. The embodiments may be obtained without one or more specific details, or with other methods, components, materials, etc. In other cases, known structures, materials, or operations have not been described in detail so that various aspects of the invention will not be obscured.

The references used herein are provided merely for convenience and hence do not define the sphere of protection of the embodiments.

With reference to the figures, the reference number 10 designates a system for loading and unloading piece-carrying containers C in an industrial plant. The containers C are represented schematically in the figures only in their load-bearing structure. However, it should be noted that in general also fixed on said structure are a plurality of racks (or other similar systems, designed to contain pieces) on which the pieces to be brought to the processing line of the plant are ordered. Said pieces are located, for example, in a storage area, where they are loaded onto the aforesaid containers and from where the latter are carried to the system via trolleys C'.

The system 10 can, for example, be used within a plant for the production of motor vehicles or else of components for motor vehicles, for continuous supply of pieces to the production line of the plant.

In various embodiments, the system 10 comprises a loading and unloading station 2 designed to receive one or more containers at a time on trolleys, coming from the storage area, and a station 3 where, as will emerge more clearly from what follows, said containers are brought and where the pieces contained therein are taken by the plant production line. In various preferred embodiments, as in the one illustrated, the loading and unloading station and the workstation are arranged in positions at a distance apart and such that, in plan view, the containers arranged on said stations are substantially aligned to one another. It should be noted that the containers can be conveyed from the storage area up to the loading and unloading station of the system, instead of on trolleys, also via another conveying device commonly used in the relevant technical sector, such as, for example, a roller track or a conveyor belt.

The system 10 comprises a turret 6 through which it is possible to change round the position of one or more containers that are located in the workstation 3 with one or more containers that are located in the loading and unloading station 2, in a single rotation of the turret and without the containers having to be parked in intermediate stations.

Thanks to the turret, it is thus possible to envisage an operation of the system in which, while a first container is located on the workstation, a second full container, coming from the storage area, is brought into the loading and unloading station so that, as soon as the pieces in the first container have run out, the first and second containers are immediately exchanged with one another by means of the turret. In this way, the new container is made available to the line of the plant in an extremely short time, and while the line picks up the pieces from this, in the meantime the empty container, which has been brought back by the turret into the loading and unloading station, is brought back into the storage area for being reloaded, and there a new container is picked up and brought into the loading and unloading station.

In various embodiments, as in the one illustrated, the turret comprises a vertical structure 8, rotatably mounted about a vertical axis on a bed 12 fixed to the floor and set between the workstation and the loading and unloading station. The aforesaid exchange of containers is obtained through a predetermined movement of rotation of the turret, during which this brings the two containers to be changed round along with it. For this purpose, the turret has means designed to lift, preferably simultaneously, the container in the loading and unloading station and the container in the workstation so as to release them and pick them up from the stations in which they are located.

In various embodiments, as in the ones illustrated, said means comprise a first lifting fork or platform 14 and a second lifting fork or platform 16, which lie in a plane orthogonal to the axis of rotation of the turret and are mobile between a lowered position and a raised position, guided along the axis of rotation of the vertical structure by appropriate drive means.

In various embodiments, to facilitate the operation of handling the containers, said lifting members have retractile portions, which, in the case of actuation of the turret, are extracted and inserted underneath the containers themselves before said members are brought into their raised position. Said portions are governed by appropriate means, for example means of a pneumatic type.

In various embodiments, as in the ones illustrated, said lifting members are carried by a single lifting body 18, which envelops the vertical structure 8 and is slidably guided along it. The lifting members 14 and 16 are positioned with respect to one another so as to be simultaneously one in the workstation and the other in the loading and unloading station, and vice versa, and hence be able to engage at the same time the containers arranged therein. In the case of the embodiment illustrated—in which the loading and unloading station and the workstation occupy opposed positions with respect to the turret—the two lifting members are arranged in diametrally opposite positions of the turret. It is clear that in the case where it is envisaged that the turret changes round two or more containers in the loading and unloading station with two or more containers in the workstation, the lifting members will for said purpose be prearranged for engaging simultaneously two or more containers at a time in both of the two stations. In various embodiments, said members can, for example, envisage a first battery of lifting forks and a second battery of lifting forks, which each comprise a set of forks that are arranged alongside one another and are each designed to lift, in one or other of the two stations of the system, a corresponding number of containers set alongside one another.

In various embodiments, as in the one illustrated, the means designed to govern the vertical movement of the lifting members are preferably carried by the vertical structure itself. Said means can be obtained in any configuration known to a person skilled in the art. In various preferred embodiments, as in the one illustrated, a rotary motor M is fixed to the top of the vertical structure and governs a shaft rotatably set within said structure, which has an external-screw portion that engages an internal-screw portion fixed with respect to the lifting body.

In alternative embodiments, the two lifting members of the turret are instead carried by two distinct lifting bodies, which can be governed by the same drive means or else by distinct drive means.

In various preferred embodiments, as in the one illustrated, the means (not illustrated) designed to govern rotation of the turret are carried by the vertical structure itself. Said means can be obtained in any configuration known to the person skilled in the art. In various preferred embodiments, said means comprise a rotary motor mounted within the vertical structure, which sets in rotation a series of gears, the last one of which acts on a ring gear fixed to the bed. In alternative embodiments, the motor and the series of gears referred to above are, instead, carried by the bed and govern a gear rigidly connected to the vertical structure.

In various alternative embodiments, instead of the lifting forks, the turret can envisage articulated arms designed to engage and lift the containers.

In view of the foregoing, it should be noted that, as compared to the solutions of the known art, the turret illustrated above enables faster changes of the containers and more precise positioning thereof. This is principally obtained thanks to the fact that the turret described herein handles the containers directly, lifting them and releasing them from the trolleys with which the containers have been conveyed up to the system, instead of leaving them on said trolleys, as instead occurs in conventional systems. Thanks to the aforesaid characteristics, the system described herein can consequently be advantageously associated to a manipulator robot that automatically picks up the pieces from the containers and that, for said purpose, can be programmed on the basis of the predetermined position in which the containers are located in the workstation. This is, instead, not possible with conventional systems since in said systems the positioning of the containers is not obtained in a sufficiently controlled way for guaranteeing these to be always arranged in the same predetermined position.

Figure 4:
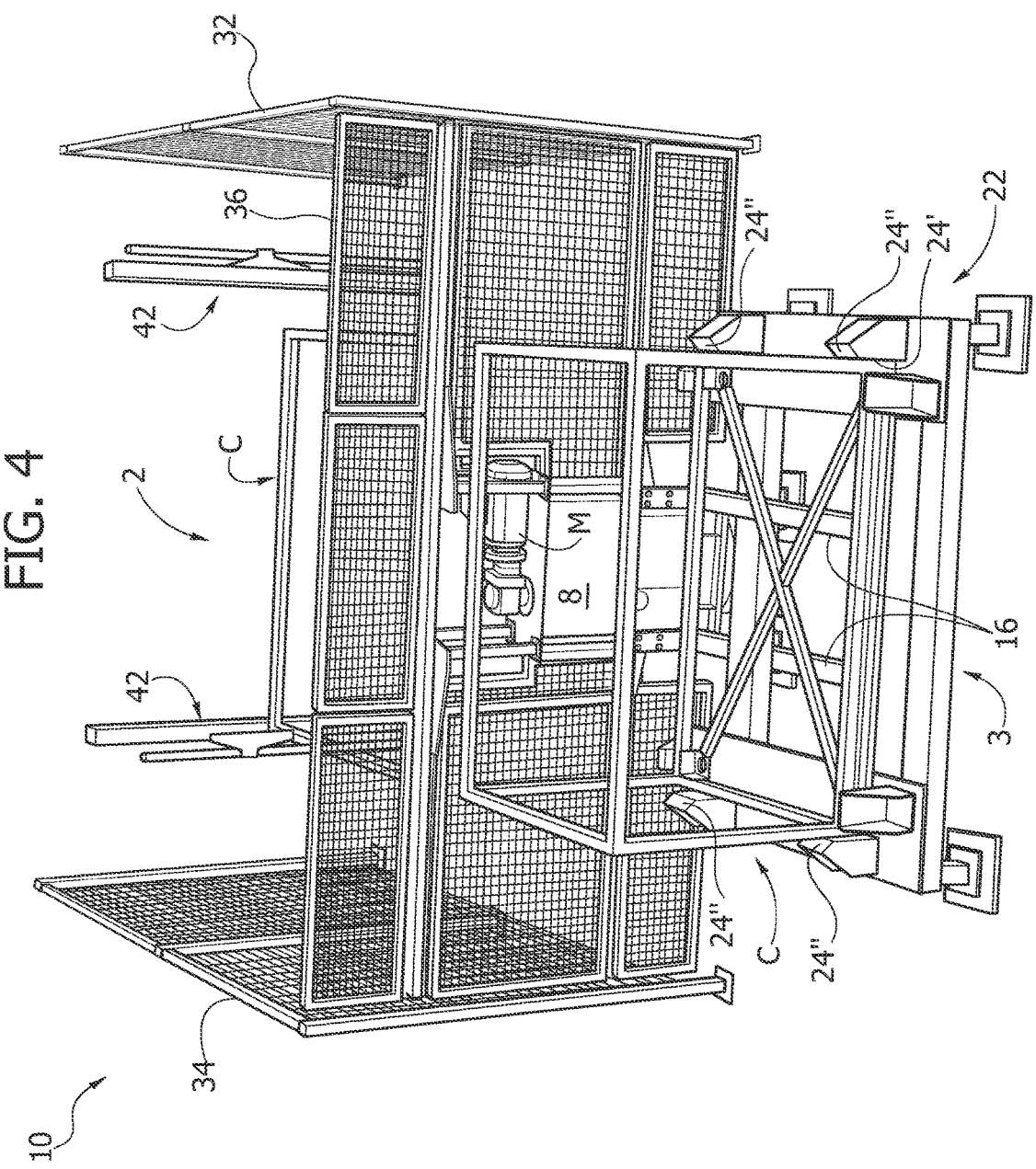
FIG. 4 is a perspective view of the workstation of the system of FIG. 1.
Figure 5A:
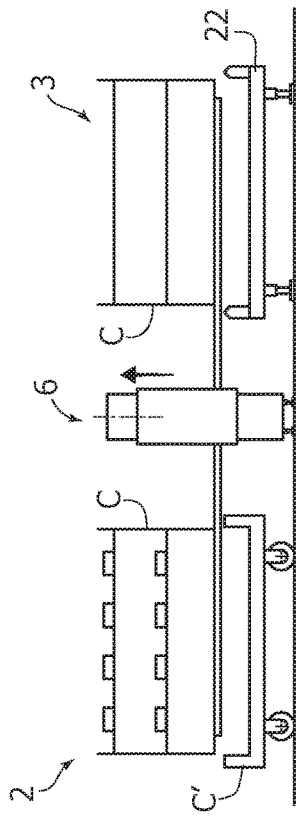
FIG. 5A is a schematic front view showing an example of one step of the transferring, exchange and unloading of a workpiece.
Figure 5C:
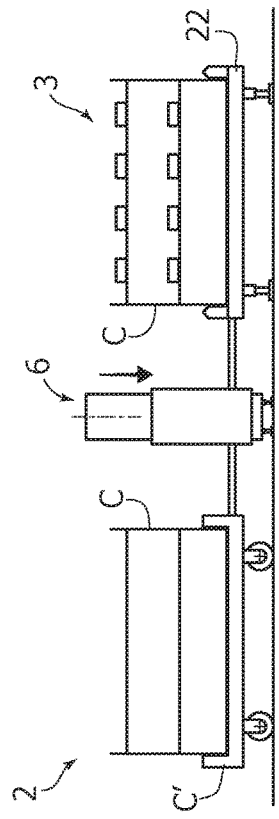
FIG. 5C is a schematic front view of an example of another step in the process of FIG. 5A.
Figure 5B:
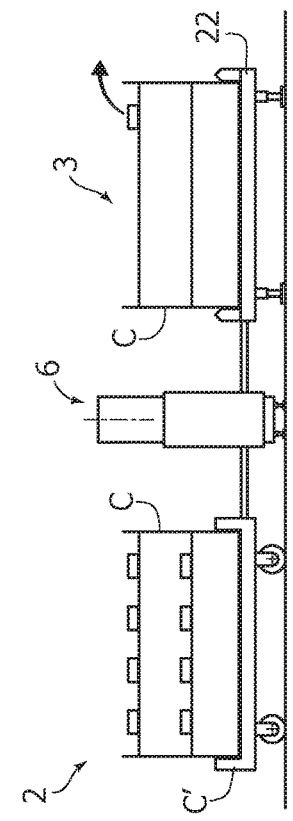
FIG. 5B is a schematic front view of an example of another step in the process of FIG. 5A.
Figure 5D:
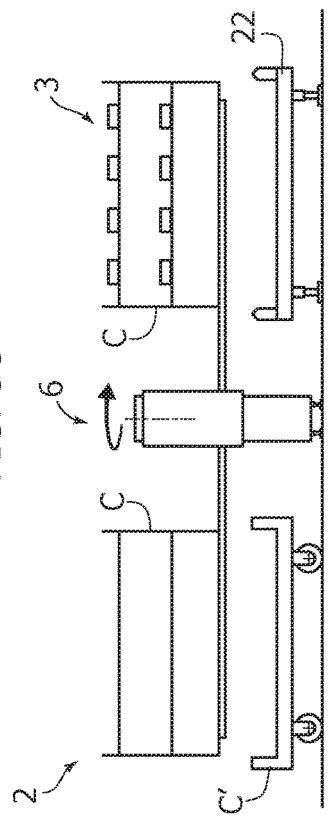
FIG. 5D is a schematic front view of an example of another step in the process of FIG. 5A.

In various embodiments, as in the one illustrated, the workstation comprises means fixed to the floor, designed to receive the container or containers that are released by the turret in the workstation. In various embodiments, as in the one illustrated, said means are designed to provide a set of references for positioning the container or containers in a precise and predetermined way. Specifically, said means comprise guide surfaces, inclined with respect to a vertical direction, which are designed to engage each container and to orient it in the correct position while the latter is made to drop downwards by the turret. In various embodiments, as in the one illustrated (see FIG. 4), the workstation comprises a board 22 designed to define at the top a resting surface for the container. Said board has reference plates 24 on said resting surface, each having a vertical wall 24' and, on top of said wall, a guide wall 24" inclined with respect to the vertical. Said plates are mutually arranged in such a way that their respective vertical walls are designed to contain the four sides of the container, substantially without allowing the latter any possibility of moving, and their respective inclined walls are, instead, designed to guide the container between said vertical walls while said container is made to drop towards the resting surface. It is clear that, in the case where a number of containers are released by the turret in the loading and unloading station at the same time, the board 22 must present a number of plates 24 and an arrangement thereof that are suited for receiving and positioning a number of corresponding containers at the same time in a precise and predetermined way.

The structure of the board is not described in any further detail in so far as it could be obtained, as regards its particular features, in any way known to the person skilled in the art. In general, the board must evidently in any case present a configuration such as to enable the lifting members described above to operate in the ways referred to above, without any impact occurring between the members and the board itself. The same reasoning also applies to the trolleys with which the containers are brought to the loading and unloading station 2.

In alternative embodiments, instead of the board referred to above, it is in any case possible to envisage even just a simple resting surface.

Figure 3:
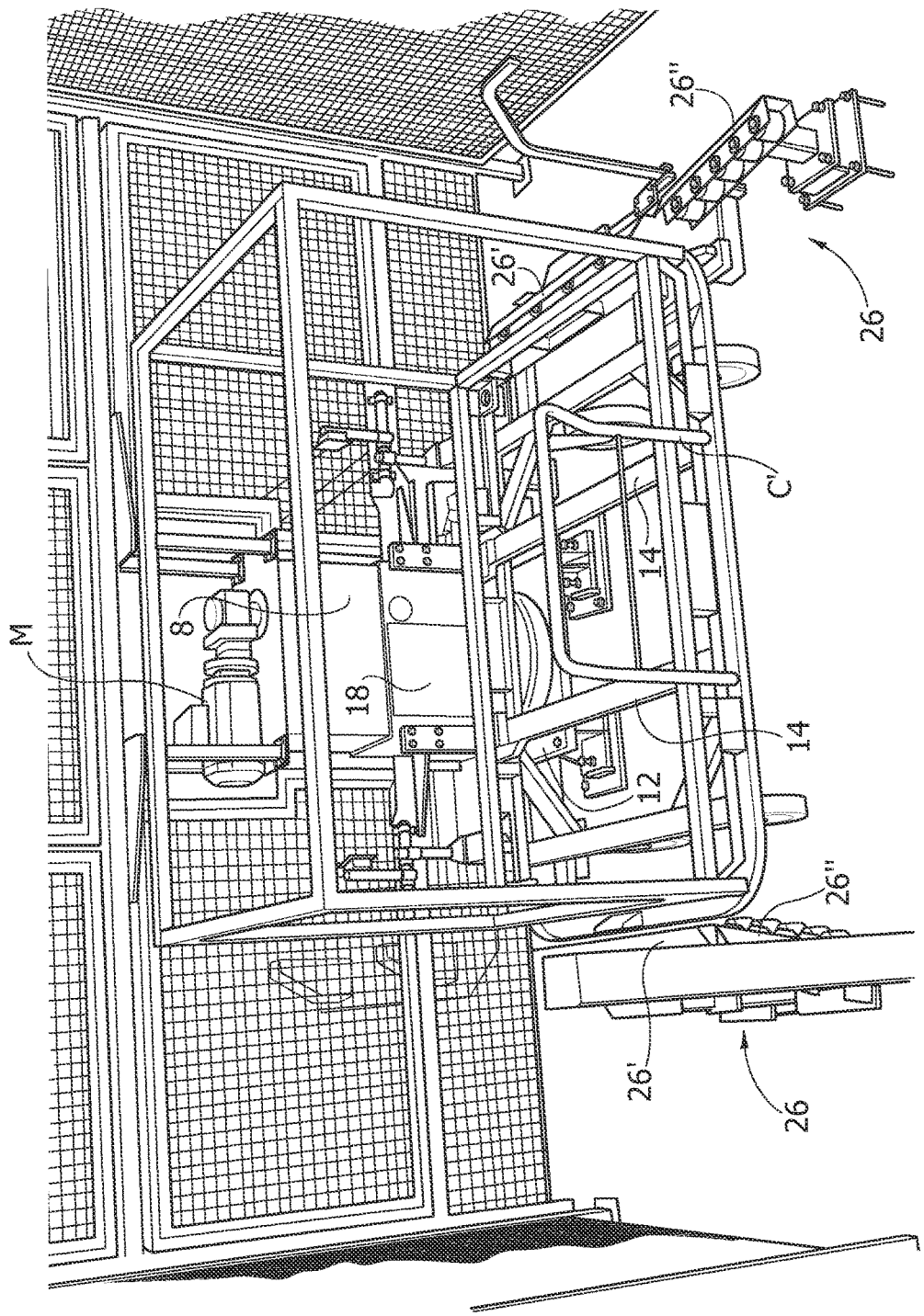
FIG. 3 is a perspective of the loading and unloading station of the system of FIG. 1.

In various embodiments, as in the one illustrated (see FIG. 3), the loading and unloading station 2 has, instead, means for receiving and guiding up to the turret the trolley with which the containers are brought to the system. With reference to the figures, in various embodiments, as in the ones illustrated, said means comprise a bank of freely rotatable rollers 26 that are mounted on brackets anchored to the floor and are arranged in two opposed and substantially parallel rows 26'. In various embodiments, as in the ones illustrated, said bank of rollers comprises, in front of the two parallel rows 26', a further two mutually diverging rows 26", designed to create a sort of lead-in for insertion of the trolley between the two parallel rows. In various embodiments, the station 2 has means of the same type as the one described above but designed to receive a number of trolleys at a time.

Illustrated hereinafter is an example of operation of the system described herein.

As already mentioned previously, a preferred operating mode of the system envisages that a full container is carried to the loading and unloading station, in a position corresponding to the turret, when a container is already engaged in the workstation. As soon as the pieces in said container are finished, the two members 14, 16 of the turret rise and pick up one the empty container, which is located in the workstation, and the other the full container, which is located in the loading and unloading station. The two containers are brought into a raised position whereby the turret is free to rotate without them impacting against elements of the system surrounding the turret. In particular, the container in the workstation is raised so as to set itself on top of the reference plates 24 of the board. At this point, the turret is rotated, in the example of the figures, through 180°, so as to bring the full container into a position corresponding to the workstation and the empty container into a position corresponding to the loading and unloading station. The two containers are then lowered and released, the full one on the receiving means of the workstation and the empty one on the trolley C', which is located in the loading and unloading station and via which the full container had been previously brought there. The line of the plant can then resume picking up the pieces from the new container, while in the meantime the empty container is brought into the storage area and there another container is picked up and taken to the loading and unloading station.

In various embodiments, as in the one illustrated, the loading and unloading station is delimited laterally—in the direction transverse to the direction of entry of the trolleys— by a first separation module 32 and a second separation module 34, both made up, for example, of a protective panel or grill, and at the front, at the boundary with the workstation, by a third separation module 36 similar to the other two modules, which sets itself between the workstation and the loading and unloading station and joins the two lateral modules 32 and 34. Said separation modules enable separation of the loading and unloading station from the rest of the plant so as to identify an area within which the operator can move around in total safety. In various embodiments, as in the one illustrated, the third separation module 36 is carried by the turret itself so as to be rotatable therewith. In particular, said module is set in a vertical plane containing the axis of rotation of the turret so that, whenever the turret makes a change of containers by turning through of 180°, it is turned over on itself without changing its position between the two modules 32 and 34.

In various embodiments, the system comprises control means designed to govern the turret according to the operating mode referred to above. In the area of the loading and unloading station, the system can envisage a control unit, via which the operator can select the desired operating mode.

Finally, in various embodiments, as in the ones illustrated, provided in the area of the loading and unloading station 2 is a safety system that intervenes by blocking the machine in due time in the case where an operator attempts to enter the protected area during any of the movements of the machine. Said safety system in the embodiment illustrated is constituted by a vertical opto-electronic barrier 42 and by one or more laser scanners 43, which interact with the safety system of the plant.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A system for loading and unloading piece-carrying containers (C) in an industrial plant, comprising:
    one or more trolleys each adapted to support a container;
    a floor-level loading/unloading station (2) for loading and unloading each container carried on one of the trolleys positioned in the floor-level loading/unloading station, the trolleys separate and independent of the loading/unloading station;
    a fixed, non-movable position workstation (3) positioned opposite of the floor-level loading/unloading station to which respective loaded containers are brought and deposited and at which the pieces are taken from said respective containers at the fixed position workstation; and
    a turret (6), which can turn about a vertical axis of rotation and is designed to remove first containers carrying pieces from the independent trolley and exchange position with one another a second container empty of pieces in said fixed position workstation through a predetermined movement of rotation of said turret,
    said system being characterized in that in order to carry out said position exchange of said first containers carrying pieces positioned at the loading/unloading station and second containers empty of pieces positioned at the fixed position workstation, said turret is configured for lifting upward said first container from said trolley and second container from said fixed position workstation, rotate about the vertical axis to reposition the first container at the fixed position workstation and the second container at the loading/unloading station, and lower the first and second containers to deposit the second container on the trolley and the first container in the fixed position workstation, the first position workstation having a reference for dimensionally fixedly positioning the first container in a precise and known positional location for removal of pieces from the first container.

2. The system according to claim 1, wherein said turret comprises a first lifting fork or platform (14) and a second lifting fork or platform (16), which lie in a plane orthogonal to the axis of rotation of the turret and are mobile between a lowered position and a raised position, guided along the axis of rotation of the turret by drive means.

3. The system according to claim 2, wherein said first and second lifting forks or platforms are carried by a single lifting body (18) that envelops the vertical structure of said turret and is slidably guided along it, and wherein said first and second lifting forks or platforms are mutually arranged so as to be simultaneously one in the fixed position workstation and the other in the floor-level loading/unloading station, and vice versa.

4. The system according to claim 1, wherein said turret is designed to position said first containers in co-operation with said fixed position workstation reference for positioning said first containers in a precise and predetermined way.

5. The system according to claim 4, wherein said fixed position workstation reference comprises guide surfaces, inclined with respect to a vertical direction, which are designed to engage the first container and to orient it in the correct position whilst the first container is made to drop downwards by the turret.

6. The system according to claim 5, wherein said fixed position workstation reference comprises a board (22) designed to define a resting surface for the first container and comprising, on said resting surface, reference plates (24), each having a vertical wall (24') and, on top of said vertical wall, a guide wall (24") inclined with respect to the vertical, said plates being mutually arranged in such a way that their respective vertical walls are designed to contain the sides of the first container, substantially without allowing this any possibility of moving, and their respective inclined walls are instead designed to guide the first container between said vertical walls while the first container is made to drop downwards towards the resting surface.

7. The system according to claim 1, wherein the loading/unloading station has means for receiving and guiding said trolley up to the turret.

8. The system according to claim 7, wherein said means for receiving and guiding said trolley up to the turret comprise a bank of freely rotatable rollers (26), which are mounted on brackets fixed to the floor and are arranged in two opposed and substantially parallel rows (26'), designed to guide the trolley during approach to the turret, and two mutually diverging rows (26"), set in front of said parallel rows and designed to create a sort of lead-in for insertion of the trolley between the two parallel rows.

9. The system according to claim 1 wherein the trolleys are separate and independent of turret.

10. A system for reciprocally exchanging positions of piece containers for use in continuously supplying pieces for an industrial plant assembly line, the system comprising:
    a plurality of trolleys each selectively operable to support a first piece container carrying pieces or a second piece container empty of pieces;
    a floor-level loading/unloading station (2) operable to receive one of the plurality of trolleys positioned on an assembly plant floor and supporting a respective first or second piece container, each trolley separate and independent of, and independently movable with respect to, the loading/unloading station;

a fixed-position, non-movable workstation (3) positioned at a first angular distance from the loading/unloading station, the fixed-position workstation operable to automatically position a deposited first container in a dimensionally known and fixed position;

a manipulator robot positioned proximate the fixed-position workstation operable to selectively remove pieces from the first container positioned at the fixed-position workstation to support the industrial plant assembly line until the first container positioned at the fixed-position workstation is empty of pieces;

a turret (6) positioned directly between and immediately adjacent to the loading/unloading station and the fixed-position workstation, the turret further comprising:
  a lifting body positioned along and linearly movable relative to a vertical axis, the lifting body further selectively rotatable about the vertical axis;
  a first lifting member connected to the lifting body and extending radially outward relative to the vertical axis, the first lifting member operable to engage the first container positioned on a respective trolley positioned at the loading/unloading station; and
  a second lifting member connected to the lifting body extending radially outward relative to the vertical axis and positioned at the first angular distance from the first lifting member, the second lifting member operable to engage the second piece container positioned at the fixed-position workstation, wherein the turret is selectively operable to lift the first piece container positioned at the loading/unloading station and the second piece container positioned at the fixed-position workstation along the vertical axis and exchange positions of the respective first and second piece containers through a single continuous rotation about the vertical axis and then lower the respective first and second piece containers at the respective loading/unloading station and the fixed-position workstation thereby replenishing the fixed-position workstation with a first container carrying pieces to support continuous assembly line operations.

11. The system according to claim 10, wherein said each of the first and the second lifting members further comprises:
  one of a lifting fork or platform positioned in a plane orthogonal to the vertical axis of the turret and are mobile between a lowered position and a raised position along the vertical axis of the turret by a drive device.

12. The system according to claim 10, wherein said fixed-position workstation comprises:
  a board (22) having a resting surface operable to support the piece container carrying pieces, the board is positionally fixed and non-movable relative to the turret; and
  a plurality of reference plates (24) connected to the board, each reference plate having a vertical wall (24') and a guide wall (24") inclined with respect to the vertical, the plurality of reference plates positioned and operable to abuttingly engage sides of the respective first and second piece containers deposited at the fixed-position workstation to temporarily positionally confine the first container in a predetermined three-dimensional coordinate location between the reference plates.

13. The system of claim 10 further comprises:
  a vertical structure defining the vertical axis, the lifting body positioned about and movable relative to the vertical structure and the vertical axis; and
  a drive connected to the lifting body operable to move the lifting body linearly and rotatably relative to the vertical axis.

14. The system of claim 10 further comprising:
  a separation module panel (36) positioned between the loading/unloading station and the fixed position workstation, the separation module panel connected to the turret and rotatable about the vertical axis along with the first and the second lifting members.

* * * * *